Nov. 12, 1957 K. A. KNUTSEN 2,812,903

CALCULATING MACHINES

Filed April 19, 1951 3 Sheets-Sheet 1

INVENTOR
KNUT ANDREAS KNUTSEN
By: Haseltine, Lake & Co.
AGENTS

INVENTOR
KNUT ANDREAS KNUTSEN
By: Haseltine, Lake & Co.
AGENTS

INVENTOR
KNUT ANDREAS KNUTSEN
By:
Haseltine, Lake & Co.
AGENTS

United States Patent Office 2,812,903

Patented Nov. 12, 1957

2,812,903

CALCULATING MACHINES

Knut Andreas Knutsen, Paris, France, assignor to Compagnie des Machines Bull (Societe Anonyme), Paris, France Application April 19, 1951, Serial No. 221,775

Claims priority, application France January 4, 1951

13 Claims. (Cl. 235—61)

Figure 1:
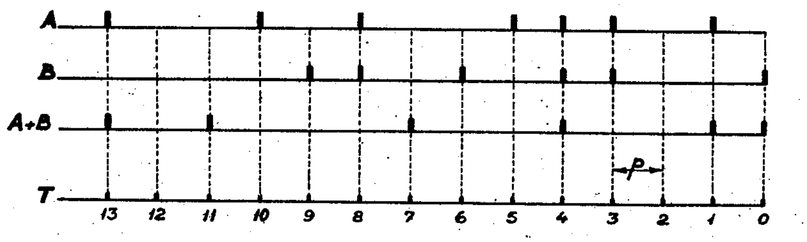

The present invention relates to devices applicable to electronic calculating machines operating on the binary system, in which the numbers treated by the calculator appear in the form:

$$a_0 2^0 + a_1 2^1 + a_2 2^2 + \ldots + a_n 2^n$$

in which the coefficients $a_0$, $a_1$, $a_2$ . . . $a_n$ of successive binary ranks can take only the magnitudes 1 or 0 and are transcribed respectively either by an impulse governed in time by a difference of time in relation to a suitable start, in proportion to the binary rank in question—or by the absence of such impulse. To simplify, we will hereinafter state that the impulses characterizing the number are "coded." This therefore implies that the origin of the time may be precisely defined, in practice by the transmission of a pilot signal (also called "timing"), or else, in a second method, by a succession of these signals coinciding with the successive binary ranks and thus successively separated from each other by what may be termed a binary period; in practice it may be assumed that the second method will be used, as the passage from one to the other is known.

More precisely, the invention relates to operative devices (or, for the sake of simplification, operators), i. e. devices permitting accomplishment of the operation of the calculating machine: this operator receives the terms of the operation on separate inlets, each in the form of coded impulses, and it delivers the result upon an outlet, likewise in the form of coded impulses.

The invention relates therefore to a device which operates successively on different binary ranks, in proportion to the introduction of impulses corresponding to each of the terms of the operation, forming carryovers, if any, which are added to the higher binary rank. More particularly, there is contemplated in what follows hereinafter, operator devices for operations (addition or subtraction) of two terms, although it is possible to extend the operator device (for addition) to more than two terms, or to other arithmetical operations.

The invention further has for its object an efficacious operation device, comprising a registration part which, by virtue of appropriate delay elements in the interval of a binary period, successively registers any impulses of the terms of the operation and any carry-over impulses that it has itself previously produced, a gating part for permitting or not the passage of an impulse, at the end of the contemplated binary period, under the control of said registration part depending upon the result thereby registered, a part for zeroizing the registration part at the end of the binary period, the ends of successive binary periods being marked by signals in regular rhythm (called "timing") applied to the said parts.

The invention has for its further object a device for the operation of addition or subtraction of two terms, comprising a first trigger into which successively flow the two impulses of the same binary rank, corresponding to the two terms of the operation, and the carryover impulse of the lower binary rank, each by means of the intermediate suitably selected delay elements, as well as a second trigger controlling the said carryover impulse; the device, according to the invention, also necessarily includes the means for making the result visible.

Moreover, the invention has for a further object a device for the operation of addition or subtraction of the above-described type in which the three differences between the delays produced (namely, in the transmission to the first trigger, of impulses of the first term of the operation, of impulses of the second term, and of carryover impulses) are greater than the reversing time of the first trigger, the two first delays corresponding to the two terms of the operation, and the third delay, corresponding to the carryover, being less than a binary period. According to the invention, although it is not absolutely indispensable, the embodiment of operative devices of the type in question is contemplated, wherein the said delays introduced are at least approximately whole multiples of a common magnitude, a submultiple of the binary period.

Figure 2:
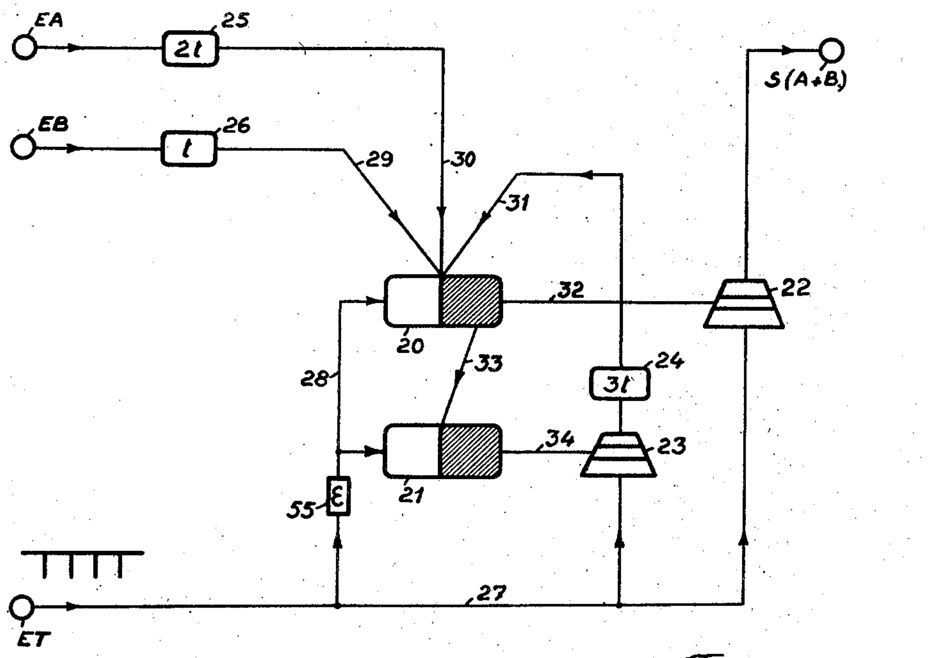
Figure 3:
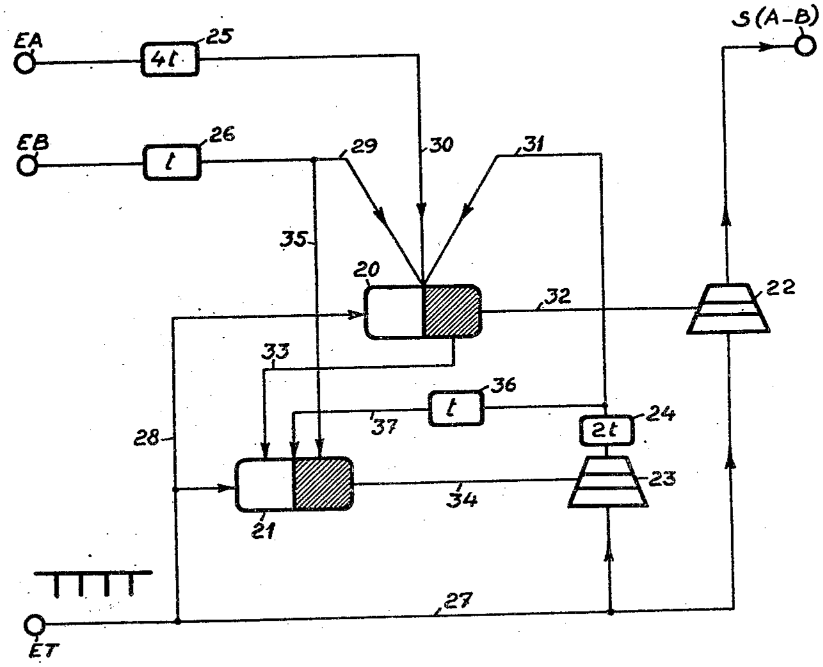
Figures 4, 4A:
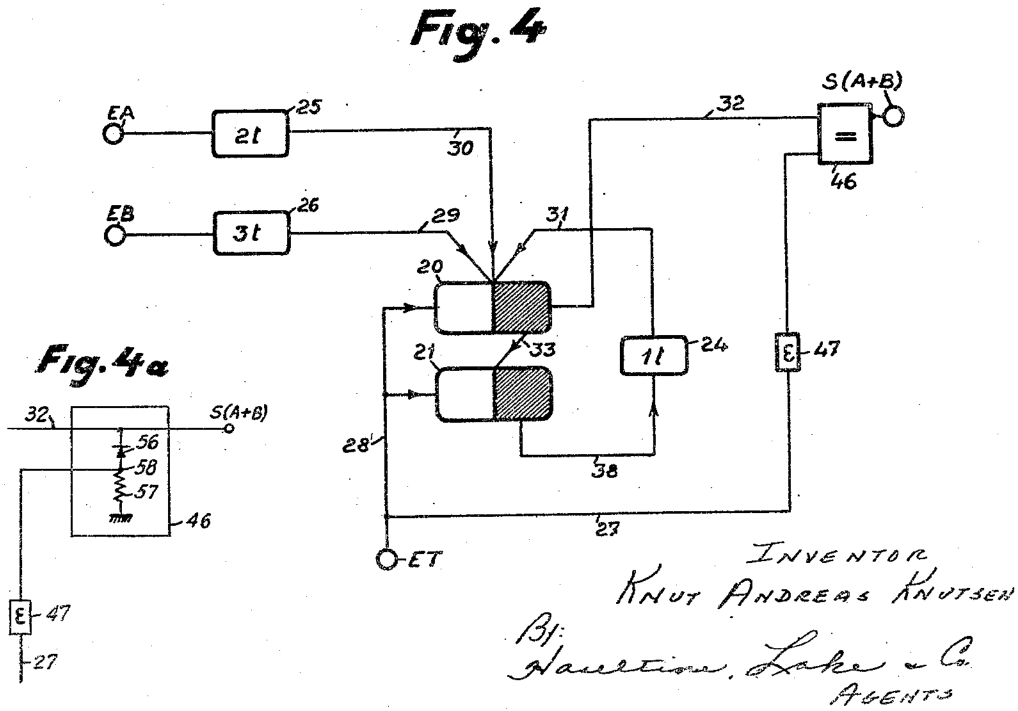
Figure 5:
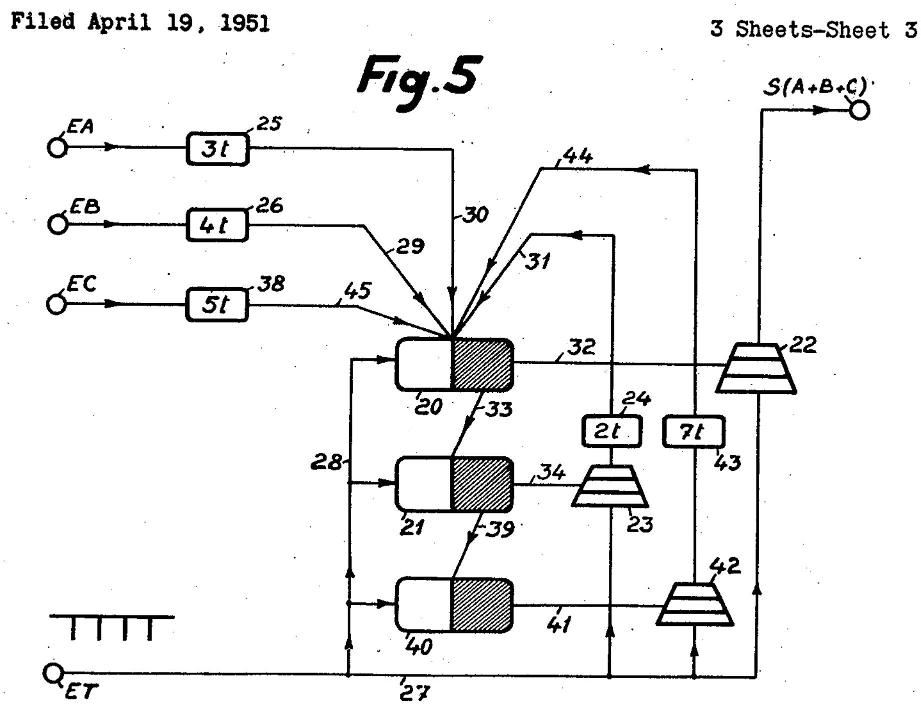
Figure 6:
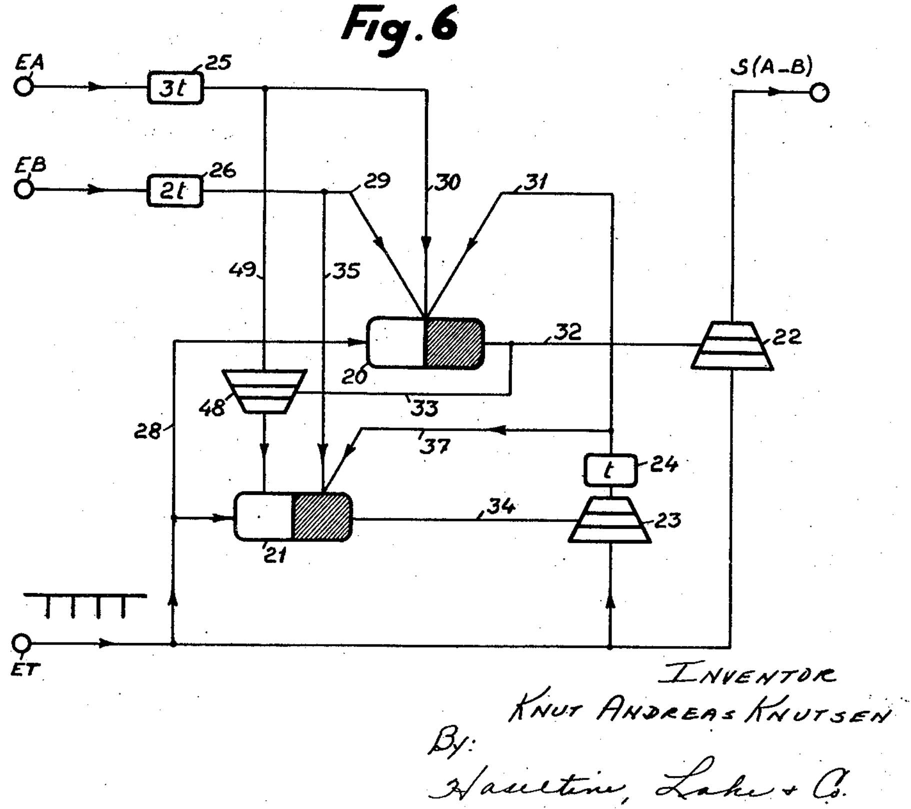

The invention can be better explained and understood upon reference to the accompanying drawings, which represent:

Fig. 1, successions of coded impulses for the terms of an operation in addition;

Fig. 2, a two-term addition operator;

Fig. 3, a subtraction operator;

Fig. 4, a two-term addition operator, simplified;

Fig. 4*a*, a detail of a part of Fig. 4;

Fig. 5, a three-term addition operator;

Fig. 6, a subtraction operator, varying from that of Fig. 3.

In Fig. 1 the two terms A and B of an addition are represented by vertical dashes (and the absence of dashes) in register with the "timing" impulses at T, it being understood that the abscissae 0, 1, 2 . . . 13 on the horizontal axes represent times, the interval between two of the said successive abscissae being equal to the binary period $p$. At A+B is obtained the representation, coded in time, of the sum of the two terms, according to the following rules:

Impulse 0 at $A$+impulse 0 at $B$ gives impulse 0 at $A+B$
Impulse 1 at $A$+impulse 0 at $B$ gives impulse 1 at $A+B$
Impulse 0 at $A$+impulse 1 at $B$ gives impulse 1 at $A+B$
Impulse 1 at $A$+impulse 1 at $B$ giving impulse 0 at $A+B$ +carryover impulse 1 impulse 1 at $A$+impulse 1 at $B$+carryover impulse 1 gives impulse 1 at $A+B$+carryover impulse 1.

The carryover impulse formed is added to the binary rank immediately above, for example, that formed in phase 3 is added to phase 4.

The addition operator shown in Fig. 2 is constructed so as to operate according to these principles. It includes two triggers 20 and 21, represented diagrammatically by rectangles, each of which is of the electronic type known as "flip-flop," with two stable states of equilibrium of the type conceived by Eccles Jordan. Reference may be made, if desired, for illustration and operation of these devices, to the U. S. patent application filed July 1, 1950, Serial No. 171,684 for "Electronic Calculators." Such a flip-flop is essentially made of two triodes one of which is always conductive and the other nonconductive; it possesses two states of equilibrium, one of which is the "working" or "one" position and the other the "rest" or "zero" position. The two triodes exchange their states when going from one position into the other. The flip-flop shown in said U. S. patent application (Fig. 1*a*) possesses therefore two inlets, one called symmetrical, the other asymmetrical; when an impulse is applied on the first inlet, the state of equilibrium of the flip-flop is reversed. When an impulse is applied on the second inlet, said state is reversed only if the flip-flop was in a determined one of its two states of equilibrium. A flip-flop can very well be considered as a register since, when starting from the "zero" position, it is brought to the "1" position, or remains in "0" position according to the presence or absence of an incoming pulse applied to its symmetrical inlet. It is "zeroized," that is, brought back to zero, from its "1" position by a pulse applied to its asymmetrical inlet.

Fig. 2 also shows two elements called "gates," 22 and 23, allowing the passage of impulses following the direction of the arrows only if an appropriate control voltage is applied to a separate input: these elements are likewise well known and are described for instance in the book "High Speed Computing Devices," McGraw-Hill, 1950, pages 37 to 43. The line 32 is connected to the control grid of the right hand triode of trigger 20. Gate 22 provides a negative impulse to $S(A+B)$ only when a negative voltage is being transmitted from said control grid to said gate; this condition is obtained when trigger 20 is in the "1" position. All the gates shown in the figures are connected in the same manner. The wiring diagram of Fig. 2 likewise shows three delay elements 24, 25, 26, each with different delay times; for example the delay times of elements 24, 25, 26 are respectively equal to $3t$, $2t$, $t$, $t$ being equal to the quarter of the duration of one binary period, said binary period being the period of timing impulses. In other words, the period of timing impulses is equal to $4t$. The timing impulses are generated at times 0, $4t$, $8t$, etc. Such delay elements are described for instance by Moskowicz and Raeber, in the Review "Radio News," No. 38, April 1948, pages 15, 18, 30, 31.

The wiring diagram of Fig. 2 has three input terminals EA, EB, ET and one output terminal $S(A+B)$. The arrows indicate the direction of movement of the impulses. At EA and EB enter the coded impulses representing the terms of the addition; at ET, those of the timing; at $S(A+B)$ are collected the output impulses of the result.

On the diagram, the shaded lines as they appear in the triggers indicate that the triggers are at the "rest" position. The gate 22 controlled by an output of 20 through the connection 32, is also in the rest position, that is, it blocks the passage of timing impulses toward $S(A+B)$. The same is true of the gate 23 controlled by an output of 21 through intercession of connection 34.

The eventual impulses progressing along the connections 29, 30, 31, arrive to the symmetrical input of the trigger 20 at instants which are sufficiently apart from each other in the course of a binary period so as to avoid overlapping, the duration of said impulses being shorter than the delay time $t$. Therefore, between the successive arrivals of two such impulses the trigger 20 has time to proceed from one of its positions of equilibrium to the other. Connection 28 leads the timing impulses to asymmetrical inlets of the flip-flops 20 and 21, by throwing the latter back to the 0 position (rest) if they happen to be in (working) position 1. Flip-flop 21 is controlled by 20, by means of the connection 33; when 20 moves from the "working" to the "rest" position, a negative-going impulse is transmitted to 21, which is reversed from the "rest" position to the "working" position. When 20 passes from the "rest" position to the "working" position, the resulting positive-going impulse is not able to reverse 21.

It may be seen, in referring again to the different cases examined in connection with Fig. 1, that the operator of Fig. 2 accomplishes the addition correctly.

If no impulse occurs, the flip-flops 20 and 21 remain in the rest position, the two gates 22 and 23 are blocked, no impulse appears at output terminal $S(A+B)$. If an impulse occurs at the symmetrical inlet of the flip-flop 20 (whether it be through 29, 30, or 31), the latter is reversed, whereby a certain potential is applied to gate 22, permitting the timing impulse to attain output terminal $S(A+B)$. The reversal of 20 is produced within a given binary period, and its precise instant, counting from the moment when this period begins, as indicated by the timing signal, is $t$ if the impulse comes from EB, $2t$ if the impulse comes from EA, and $3t$ if the impulse originates from a carryover (called inside carryover), which itself is formed pursuant to a mechanism to be hereinafter described.

At the end of the binary period, the timing impulse traverses 22. No other will occur—unless new impulses are applied to the symmetrical inlet of the flip-flop 20—for flip-flop 20 is at this instant zeroized through 28. The return of the trigger 20 to the 0 position provides a negative impulse which arrives through the lead 33 to the symmetrical input of the trigger 21. But at the same time the timing impulse, the duration of which is chosen greater than the reversal time of trigger 20, is still present at a reset input of trigger 21 and maintains said trigger in its 0 position. In other words, the timing impulse reverses trigger 21 from 1 position to 0 position and prevents a new reversal from 0 position to 1 position owing to a negative impulse proceeding from lead 33.

It is now assumed that two impulses occur in the same binary period (these being unable to occur simultaneously on account of the delays introduced, as hereinabove explained). The first of these impulses causes 20 to be reversed; the second brings 20 back to the rest position, thus causing 21 to trip. Consequently gate 22 is blocked and gate 23 opened. Therefore, the timing impulse appearing on 27 at the end of the binary period is blocked by the gate 22 and does not arrive to S, but a carry-over impulse is produced. The latter appears $3t$ later at the symmetrical input to 20. The timing impulse at the end of the binary period throws the trigger 21 back to zero.

If we assume now that during the same binary period three impulses reach the symmetrical input to 20, it follows that the two first impulses finally bring 20 to the zero position and 21 to the 1 position. The third (the carry-over impulse) brings 20 to position 1. The two gates 23 and 22 are thus opened. An impulse arrives at $S(A+B)$ at the end of the binary period, and a carry-over is produced as before. The timing signal passing through 28 this time returns the two triggers 20 and 21 to zero.

It should be observed that the delay produced by the operator, in the transmission of impulses that it receives, constitutes a binary period. According to the embodiment just described the operator is of simple construction and uses no element with critical conditions of operation. It permits, as can be seen in practice, considerable variation in the applied voltages without thereby affecting its operation. Finally the impulses constituting the results of the addition faithfully reproduce the timing impulses without having traversed any delay element and can thus possess a shape and magnitude suited to their purpose.

Fig. 3 represents a subtraction operator according to the invention, which accomplishes the subtraction operation directly, and not as often done, by the expedient of adding a complement at the base. It is assumed that the operator accomplishes the subtraction $A-B$, with the binary number A greater than the binary number B.

In this subtraction operator are again found the basic elements, namely the flip-flops and the gates, that are comprised in the addition operator; but the links (i. e. the connections and the delay elements) are different. In the present instance, connection 33 connects the outlets of flip-flop 20 to an asymmetrical inlet of flip-flop 21, whereas the other asymmetrical inlet of flip-flop 21 is connected to the entry EB through the connection 35 and the delay element 26, the latter being also interposed on the connection 29 to the symmetrical inlet to flip-flop 20. Connection 37 permits the carryover impulses, produced in the operator, to be reintroduced into the flip-flop 21, with a delay ($t$) furnished by element 36. The total delay necessitated by the operator (between input impulses at EA and EB and those issued at $S(A-B)$) is equal to a binary period $p$, just as is the case with the addition operator.

To understand the functioning of this operator, the eight possible combinations shall be now discussed, which are shown in the following table, to be read column by column (I to VIII). In each of these columns are found successively from top to bottom: at $a$ and $b$, the respective figures (0 or 1 in the binary system) of the terms A and B of the operation, for a given binary period (it will be recalled that the operation is accomplished by successive binary periods, each of which corresponds to a different binary rank); at $rr$, the carry-over received in a binary period being derived from a former period; at $d$, the binary digit rank figure given, of the difference $a—b$; and $re$, the carryover transmitted (which may also be called the inside carryover of the operator) for the higher rank.

| | I | II | III | IV | V | VI | VII | VIII |
|---|---|---|---|---|---|---|---|---|
| a | 0 | 0 | 1 | 1 | 0 | 0 | 1 | 1 |
| b | 0 | 1 | 0 | 1 | 0 | 1 | 0 | 1 |
| rr | 1 | 1 | 1 | 1 | 0 | 0 | 0 | 0 |
| d | 1 | 0 | 0 | 1 | 0 | 1 | 1 | 0 |
| re | 1 | 1 | 0 | 1 | 0 | 1 | 0 | 0 |

It can be seen from this table that the carryover must be produced within a given binary rank each time that $a<b+rr$. (This carryover is in reality a borrowing from the binary rank immediately above.) The construction provided permits this condition to be satisfied, as will be found in the examples hereinbelow given.

It is first assumed that in a binary period, impulses arrive simultaneously at EA and EB. The EB impulse on account of the delay 26 which is less than 25, is first to arrive at instant $t$ at flip-flop 20, which moves momentarily into position 1. The EA impulse arrives next at instant $4t$ and restores flip-flop 20 to position 0. As a result, gate 22 is blocked and there is no transmission to output terminal $S(A—B)$. Flip-flop 21, which was first reversed at instant $t$ by the impulse arriving through 35 is then returned to rest position at instant $4t$ by the impulse produced through the zeroizing of 20, having come through 33; consequently, 23 is blocked and there is no carryover transmission at the end of the period. Thus, 1—1=0 has been accomplished (column VIII in the table). Here $d=0$ and $re=0$.

Let us now assume that $a=0$, $b=1$, $rr=1$. At moment $t$, within the binary period, the impulse from EB trips, on the one hand, the flip-flop 21 and on the other, the flip-flop 20. At moment $2t$ the carryover impulse reverses 20 and the impulse occurring through the zeroizing of 20, coming through 33, returns 21 to the 0 position. At moment $3t$ the same carryover impulse coming through 37 reverses 21 which goes into position 1. Consequently, gate 22 is closed and there is no output impulse at $S(A—B)$; gate 23 is open and a carryover is produced for the following binary period. Thus $d=0$ and $re=1$ have been obtained, as is to be expected pursuant to column II in the table.

It is now assumed that impulses arrive in the same binary period at EA, at EB and at the carryover connection 31 (column IV of the table, $a=1$, $b=1$, $rr=1$). The flip-flop 20 receives three successive impulses at the moments $t$, $2t$ and $4t$ in the said period. It thus comes into position 1, which opens 22. At moment $t$, flip-flop 21 receives an impulse through 35, whereby it drops into position 1; at moment $2t$, through 33, an impulse is produced by the zeroizing of 20 which restores it to the 0 position, and at moment $3t$, through 37, an impulse occurs which restores it to the 1 position, and 23 is opened. A carryover is effected at the end of the period, which again shows at the inlet 21 through connection 37, with a $3t$ delay in the following binary period. Thus, the results foreseen in the fourth column of the table from the left, namely, $d=1$, $re=1$, have been achieved.

In the light of the foregoing examples, other examples may easily be conceived and thus the action of the operator in all cases in the table can be verified.

The subtraction operator, according to the arrangement in Fig. 3, affords the same advantages of operation as the addition operator of Fig. 2, with the difference, however, that $$t=\frac{p}{4}$$

($p$ being the binary period) for the addition operator and $$t=\frac{p}{5}$$

for the subtraction operator, as can be readily seen ($t$ is in all cases examined longer than the reversing time of a flip-flop.

According to a variant embodiment of the invention, supplied as an example, in the addition operator of Fig. 2 it is possible to simplify the arrangement by replacing the two gates 22, 23, by a simple coincidence detector. This simplification, shown in Fig. 4, unfortunately involves a less satisfactory "quality" of the output impulses. In this instance, in fact, it is 20 and 21 which supply respectively the output and carryover impulses, when the same 20 and 21 are zeroized by the timing signal which passes through 28. Along the course of 27 a very brief delay (reference 47) has been introduced in such manner as to assure the perfect coincidence of impulses one of which is shifted in time by an amount equal to the duration of the reversal of 20, but this feature is not absolutely necessary. The coincidence detector 46 may be a gate of the type already mentioned or, as is known, a simple diode 56 in series with a resistor 57, arranged as shown in Fig. 4$a$. When no impulse appears on 27, any impulse originated by zeroizing of 20 within a binary period cannot be transmitted to the output terminal $S(A+B)$ with a sufficient voltage, for the resistance of 57 is very low and 56 is conducting. It is only when the voltage of the point 58 is sufficiently negatively increased by the presence of a timing impulse that an impulse on 32 can be transmitted to $S(A+B)$.

The amount of delay of parts 24, 25, 26, Fig. 4, namely, $1t$, $2t$, $3t$, respectively, provide another example of distribution of different delays which can be entertained ($t$ here representing a fourth of the binary period $p$).

On the same principles it is possible to construct an operator for the simultaneous addition of several terms. Fig. 5 is a diagram of such construction for the adding of three terms, and submitted as an example without limiting the scope of the invention; again here are found the elements of Fig. 1 (using different delaying times), a supplementary flip-flop 40, controlled by connection 39 and controlling a corresponding gate 42, actuating flip-flop 20 by means of delay element 43 and connection 44. A complementary input terminal EC connected by means of delay element 38 and connection 45 to the symmetrical inlet 20 completes the multiple addition operator. Its action is analogous to that of the two-term operator. In the present instance $t$ represents the sixth of a binary period.

The impulses passing through 44 are delayed for one binary period $+1t$; those passing through 31, $2t$; those passing through EA, EB, EC, $3t$, $4t$, $5t$, respectively. The placements are thus evenly distributed within the period for the possible arrival of impulses at the symmetrical inlet 20; yet, the widest relative divergence does not exceed $(7—2)t=5t$, or $5/6$ of a binary period.

According to a variant embodiment of the invention, applied as an example to the subtraction operator of Fig. 3, it is possible to accelerate the rate of operations by modifying the equipment, by reducing the number of delay lines and their magnitude, and by introducing a supplementary gate.

Fig. 6 shows an example of such embodiment, in which the delays of elements 24, 25 and 26 amount respectively to $t$, $3t$, and $2t$ $$\left(\text{with } t=\frac{p}{4}\right)$$

while 36 is deleted. A supplementary gate 48, a diode, is controlled by the flip-flop 20 by means of connection 33, said gate controlling the impulses of EA arriving at the flip-flop 21 through connection 49. The new lengths of the delay elements permit the even distribution of impulses within the binary period to the different parts of the operator device.

In view of the fact that the addition operator of Fig. 2 and the subtraction operator of Fig. 3 act only with a slight difference in their connections and delay elements, it is obvious that it is possible easily to carry out combination devices which can, at will, be made to act either as addition or subtraction operators, such devices lying within the scope of the invention.

From the foregoing description of the various embodiments of the invention, it can be seen that each flip-flop acts as a storing register which registers the impulses applied to its input. In Fig. 2, flip-flop 20 can store one impulse, and the combination of flip-flops 20 and 21 can store three impulses. The same may be said about Figs. 3, 4 and 6. In Fig. 5, the combination of flip-flops 20 21 and 40 can store seven impulses. Now it can be seen that the working of these devices is based on the successive registering of the impulses representing the terms of the operation and the carryovers within the binary period and on the exploration at the end of said period, of the result registered, the register being then zeroized in order to be reconditioned for the next binary period.

I claim:

1. Serial computing arrangement for combining at least two numbers represented in the binary system by electrical pulses in time relation with control pulses, comprising at least two bi-stable trigger circuits, which separately assume a "1" condition or a "0" condition, an output terminal of the first trigger having a connection to an input terminal of the second trigger, an output terminal of the second trigger having a carry connection including a first delay element to a symmetrical input of the first trigger; a control input terminal and conductors connected to a resetting input terminal of each of said triggers for applying thereto control pulses to delimit binary periods and reset the triggers at each binary period; at least two delay elements and conductors adapted to apply the pulses representative of the numbers to said symmetrical input terminal of the first trigger through said delay elements with delay times different from each other and smaller than a binary period duration; a connection between said control input terminal and an output gating circuit controlled by the first trigger so that a result pulse is delivered to a result output terminal when the first trigger stands at the "1" condition at the time of a control pulse.

2. The invention set forth in claim 1, wherein an output terminal of the first trigger is connected to the symmetrical input terminal of the second trigger whereby a first carry pulse sets the latter to a carry-registering condition when the first trigger is being reversed from the "1" condition to the "0" condition; a carry gating circuit controlled by said second trigger controlling said carry connection, a connection adapted to apply said control pulses from said control input terminal to said carry gating circuit, which passes a delayed carry pulse to the first trigger when the second trigger is set at the carry-registering condition.

3. The invention set forth in claim 1, wherein said first delay element produces a delay time different from those produced by the other two delay elements and smaller than a binary period duration.

4. The invention set forth in claim 1, wherein is provided a connection between the symmetrical input terminal of the first trigger and an asymmetrical input terminal of the second trigger, said connection being adapted to apply the delayed impulses representative of a number to be subtracted from the other to said second trigger.

5. The invention set forth in claim 1, wherein are provided a carry gating circuit under control of said second trigger and controlling the "pass" condition of said carry connection; a fourth delay element connected between said first delay element and the symmetrical input terminal of the second trigger; a connection adapted to apply said control pulses from said control input terminal to said carry gating circuit, whereby the latter causes delayed carry pulses to be transmitted to the symmetrical input terminal of both triggers when the second trigger stands at the "1" condition at the time of a control impulse.

6. The invention set forth in claim 1, wherein are provided a connection adapted to apply the delayed impulses representative of a subtrahend number, not only to the symmetrical input terminal of the first trigger, but to an asymmetrical input terminal of the second trigger; and another connection, including a gate controlled by the first trigger, and adapted to apply the delayed impulses of a minuend number to the other asymmetrical input terminal of the second trigger when the first trigger is at the "1" condition.

7. The invention set forth in claim 1, for addition of three numbers, further comprising a third trigger circuit, the first, second and third triggers being connected so as to form a pulse binary counter; further delay elements and conductors adapted to apply the pulses representative of the further numbers to said symmetrical input terminal of the first trigger with delay times different from each other and smaller than a binary period duration; a first carry gating circuit controlled by said second trigger; a second carry gating circuit controlled by the third trigger and including a delay element the delay time of which being greater than a binary period duration; connections adapted to apply said control pulses from said control input terminal to said carry gating circuits for causing differently delayed carry pulses to be applied to the symmetrical input terminal of the first trigger.

8. Device for combining numbers expressed in the binary system and represented by electrical impulses, comprising in association: an electronic impulse counting unit having a first input, a plurality of reset inputs and a first and a second output, a control input terminal and conductors connected to said reset inputs of said counting unit for applying thereto control pulses to delimit binary periods and reset said counting unit at each binary period; delay elements; means for applying impulses representative of said numbers to said first input of said counting unit through corresponding ones of said delay elements respectively delaying said impulses by times different from one another and smaller than said binary period, the differences between any two said delay times being greater than the counting time of an impulse of said counting unit, a linking circuit connected between said second output and said first input of said counting unit and adapted, when a carry-over is produced in said counting unit, to apply a corresponding impulse to said first input of said counting unit through another of said delay elements the delay time of which is different from said previous delay times and smaller than said binary period, an output gate the outputs of which are connected to the first output of said counting unit and to said control input terminal delivering said control pulses and the output of which delivers an impulse train representative of the result of the combination of said numbers.

9. Device for combining numbers expressed in the binary system and represented by electrical impulses, comprising in association: an arrangement of two bistable trigger circuits having each a first input, a reset input, and an output, the output of the first trigger circuit being connected to said first input of the second one, a control input terminal and conductors connected to said reset input of each trigger for applying thereto control pulses to delimit binary periods and reset said triggers at each binary period; delay elements; means for applying impulses representative of said numbers to said first input of said first trigger through corresponding ones of said delay elements respectively delaying said impulses by times different from one another and smaller than said binary period, the differences between any two said delay times being greater than the reversal time of said triggers; a linking circuit connected between said output of said second trigger and said first input of said first trigger and adapted, when a carry-over is produced in said second trigger, to apply a corresponding impulse to said input of said first trigger through another of said delay elements the delay time of which is different from said previous delay times and smaller than said binary period; an output gate the inputs of which are connected to the output of said first trigger and to said control input terminal delivering said control pulses and the output of which delivers an impulse train repersentative of the result of the combination of said numbers.

10. Device for accomplishing a three-term addition with terms expressed in the binary system, represented by electrical impulses emitted in regularly spaced binary periods, comprising in association: a chain of three electronic trigger circuits, each having a first input, a reset input and an output, the output of the first trigger being connected to the input of the second one, and the output of that second one being conneced to the input of the third one; five delay elements producing delay times different from one another and smaller than said binary period, the differences between any two said delay times being greater than the reversal time of said triggers, connections between said delay elements and said first input of the first trigger, three of these delay elements respectively corresponding to the terms to be added, and the other two to carry-overs; a control input terminal and conductors connected to said reset input of each of said triggers for applying thereto control impulses to reset said triggers at each binary period; connections for feeding impulses representative of the terms of the operation to their respective delay elements; a first carry-over gate under the control of the state of the second trigger for releasing an impulse onto one of the carry-over delay elements; a second carry-over gate under the control of the state of the third trigger for releasing an impulse onto the other carry-over delay element; an output gate under the control of the state of the first trigger for releasing to an output circuit of said device an impulse train representative of the result; connections from said control input terminal for applying the control impulses to said carry-over gates and to said output gate.

11. Device for accomplishing a subtraction with terms expressed in the binary system represented by electrical impulses emitted in regularly spaced binary periods, comprising in association: two electronic trigger circuits, each with a symmetrical input and a reset input, the first trigger circuit havng two outputs, the second trigger circuit having two asymmetrical inputs and one output, one of the two outputs of the first trigger being connected to one of said asymmetrical inputs of the second trigger, the symmetrical input of the first trigger being connected to the other asymmetrical input of the second trigger; three different delay elements producing unequal delay times smaller than said binary period, the differences between any two said delay times being greater than the reversal time of said triggers, two of these delay elements respectively corresponding to the terms of the subtraction and the third one to carry-overs; connections between said delay elements and the symmetrical input of the first trigger; connections between the symmertical inputs of said first and second triggers through said third delay element; a control input terminal and conductors connected to the reset input of each of said triggers for applying thereto control impulses to reset said triggers at each binary period; connections for feeding impulses representative of the terms of the operation to their respective delay elements; carry-over gating circuit under the control of the state of the second trigger for releasing an impulse onto said third delay element; an output gate under the control of the state of the first trigger for releasing to an output circuit of said device an impulse train representative of the result; connections from said control input terminals for applying the control impulses to said carry-over gating circuit and to said output gate.

12. Device for accomplishing a subtraction with terms expressed in the binary system represented by electrical impulses emitted in regularly spaced binary periods, comprising in association: two electronic trigger circuits, each with a reset input and an output, the first trigger circuit having a symmetrical input and the second trigger circuit having two asymmetrical inputs, the symmetrical input of the first trigger being connected to one asymmetrical input of the second trigger, three delay elements producing unequal delay times smaller than said binary period, the differences between any two said delay times being greater than the reversal time of said triggers, two of these delay elements respectively corresponding to the terms of the operation and the third one to carry-overs; connections between said delay elements and the symmetrical input of the first trigger; connections for feeding impulses representative of the terms of the operation to their respective delay elements; a transfer gate for transferring an impulse corresponding to one term of the operation to the other asymmetrical input of the second trigger under control of the state of the first trigger; a carry-over gate under the control of the state of the second trigger; a control input terminal and conductors connected to said reset input of both triggers for applying thereto control impulses at each binary period; and output gate under the control of the state of the first trigger for releasing to an output circuit of said device an impulse representative of the result; connections from said control input terminals for applying the control impulses to said carry-over gate and to said output gate.

13. Device for accomplishing an addition of two terms expressed in the binary system, represented by electrical impulses emitted in regularly spaced binary periods comprising in combination: a chain of two electronic trigger circuits each with a reset input and a symmetrical input and an output, the output of the first trigger being connected to the symmetrical input of the second trigger; three different delay elements producing unequal delay times smaller than said binary period, the differences between any two said delay times being greater than the reversal time of said triggers, two of said delay elements being adapted to receive and to transmit the impulses representative of said terms and the third element transmitting carry-over impulses; connections between said delay elements and the symmetrical input of the first trigger; connections for feeding impulses representative of the terms of the operation to their respective delay elements; connections for feeding carry-over impulses from the output of the second trigger to said third delay element; a control input terminal and conductors connected to said reset input of both triggers for applying thereto control impulses at each binary period; an output gate under the control of the first trigger for releasing to an output circuit of said device an impulse train representative of the result; connections from said control input terminals for applying the control impulses to said output gate.

(References on following page)

References Cited in the file of this patent

UNITED STATES PATENTS 2,590,950 Eckert et al. ------------ Apr. 1, 1952

OTHER REFERENCES

"High-Speed Computing Devices," Engineering Research Associates, McGraw-Hill Book Co., 1950 (Figs. 13–6, 13–7).

"Calculating Instruments and Machinery," D. R. Hartee, The University of Illinois Press, 1949 (Figs. 54, 58 and 61).